(12) United States Patent
Chuang

(10) Patent No.: US 6,940,804 B2
(45) Date of Patent: Sep. 6, 2005

(54) POWER CONTROL CIRCUIT FOR OPTICAL INFORMATION RECORDING DEVICE

(75) Inventor: Ying-Lang Chuang, Kaohsiung (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 10/699,740

(22) Filed: Nov. 4, 2003

(65) Prior Publication Data

US 2004/0090896 A1 May 13, 2004

Related U.S. Application Data

(63) Continuation of application No. 10/082,331, filed on Feb. 26, 2002, now Pat. No. 6,661,757.

(51) Int. Cl.$^7$ ................................................ G11B 7/00
(52) U.S. Cl. ...................... 369/122; 369/53.26; 369/116
(58) Field of Search ................................ 369/122, 121, 369/47.55, 116, 53.26, 47.1, 47.5, 47.51

(56) References Cited

U.S. PATENT DOCUMENTS

| 5,412,632 | A | | 5/1995 | Mita et al. .................... 369/116 |
| 6,249,490 | B1 | * | 6/2001 | Miyaoka .................. 369/13.14 |
| 6,320,832 | B1 | * | 11/2001 | Nakao et al. ............ 369/47.53 |
| 6,646,968 | B1 | * | 11/2003 | Miyaoka .................. 369/53.31 |

* cited by examiner

*Primary Examiner*—Nabil Hindi
(74) *Attorney, Agent, or Firm*—Rabin & Berdo, P.C.

(57) ABSTRACT

A power control circuit for an optical information recording device is disclosed. A power sampling signal from a photodiode is transmitted to a peal envelope acquiring circuit and a bottom envelope acquiring circuit and then sampled and held, which is fed-back to a laser diode driving circuit. The laser diode driving circuit alters a driving signal emitted to the laser diode according to the fed-back signal to adjust the power of the optical signal emitted from the laser diode. Therefore, cost is reduced and the power control circuit is particularly suitable for high-speed recordable optical disk drive.

14 Claims, 9 Drawing Sheets

POWER CONTROL CIRCUIT FOR OPTICAL INFORMATION RECORDING DEVICE

This is a continuation of application Ser. No. 10/082,331, Filed Feb. 26, 2002 now U.S. Pat. No. 6,661,757.

BACKGROUND OF THE INVENTION

1. Field of the Invention

This invention relates in general to a power control circuit for an optical information recording device. More specifically, this invention relates to a power control circuit suitable for a high-speed optical information recording device.

2. Description of Related Art

The optical information recording apparatus, such as a recordable (or re-writable) optical disk drive, becomes wide-used and popular because of a high demand of high capacity back-up. When a recordable optical disk drive records data or information to a Recordable/Re-Writable Compact Disc (CD-R/CD-RW), beam for recording data is generated by a laser diode. The laser diode has to provide three optical signals with different power during the entire recording process. The data region of an optical disc will alter its state in response to the optical signal with specified power.

FIG. 1 schematically shows a graph that power of an optical signal during writing varied with respect to its corresponding data area of an optical disc. The data area of a re-writable optical disc includes a space region and a mark region. The mark region records data that is encoded by logic "1" and logic "0". The laser diode has to generate an optical signal with erase power $P_{ERASE}$ to illuminate the optical disc when the laser beam reaches the space region. In addition, the laser diode has to generate optical signals with write power $P_{WRITE}$ and bias power $P_{BIAS}$ alternately to illuminate the optical disc when the laser beam reaches the mark region. When data is written to the mark region, the required times for generating the write power $P_{WRITE}$ and the bias power $P_{BIAS}$ is determined by the characteristic of the optical disc and the specification of data to be recorded.

However, the characteristic of the laser diode varies with the environment temperature and time. During the recording process, as the recording time increases, the temperature of the laser diode increases. Namely, under the condition that the driving signals inputted to the laser diode are the same, the laser diode outputs optical signals having different power due to different temperature. When the laser diode is aged, the optoelectronic characteristic of the laser diode may change. Therefore, a power control circuit for compensating power variation due to change of the optical characteristic of the laser diode is highly required. If the bias power is not compensated, the laser diode may completely turn off during certain periods, and to turn on the laser diode again requires a larger current or a longer time.

FIG. 2 shows a conventional power control circuit for a recordable optical disc. The laser diode D1 receives the driving signal from the laser diode driving circuit 202 to generate a corresponding optical signal. The optical signal is illuminated to an optical disc (not shown) for recording data on the optical disc. In order to compensate the optical signal, a photodiode D2 is used for sensing the optical signal emitted from the laser diode D1 to generate a corresponding power sampling signal PI. The power sampling signal PI comprises an erase period corresponding to an optical signal with erase power of $P_{ERASE}$, a write period corresponding to an optical signal with write power of $P_{WRITE}$, a bias period corresponding to an optical signal with bias power of $P_{BIAS}$.

The power sampling signal PI is transmitted to an erase-period sample-and-hold circuit 204, a write-period sample-and-hold circuit 206, and a bias-period sample-and-hold circuit 208, respectively.

The erase-period sample-and-hold circuit 204 is controlled by an erase sampling control signal ESC to sample the power sampling signal PI within the erase period, by which an erase-period sample-and-hold signal EPSH is generated and then fed-back to a feedback control circuit 205. The feedback control circuit 205 converts the erase-period sample-and-hold signal EPSH to a signal that is acceptable to the laser diode driving circuit 202 and then transmits the converted signal to the laser diode driving circuit 202. The write-period sample-and-hold circuit 206 is controlled by a write sampling control signal WSC to sample the power sampling signal PI within the write period, by which a write-period sample-and-hold signal WPSH is generated and then fed-back to a feedback control circuit 205. The feedback control circuit 205 converts the write-period sample-and-hold signal WPSH to a signal that is acceptable to the laser diode driving circuit 202 and then transmits the converted signal to the laser diode driving circuit 202. The bias-period sample-and-hold circuit 208 is controlled by a bias sampling control signal BSC to sample the power sampling signal PI within the bias period, by which a bias-period sample-and-hold signal BPSH is generated and then fed-back to the feedback control circuit 205. The feedback control circuit 205 converts the bias-period sample-and-hold signal EPSH to a signal that is acceptable to the laser diode driving circuit 202 and then transmits the converted signal to the laser diode driving circuit 202. Accordingly, the laser diode driving circuit 202 alters the driving signal that is outputted to the laser diode D1 according to the erase-period sample-and-hold signal EPSH, the write-period sample-and-hold signal WPSH, and the bias-period sample-and-hold signal BPSH so as to adjust the erase power, the write power and the bias power of the optical signal, by which the compensation for the optical signal is completed.

FIG. 3 shows waveforms of the power sampling signal PI, the write sampling control signal WSC and the bias sampling control signal BSC in FIG. 2. FIG. 3 only shows the waveforms in the write period and the bias period of the power sampling signal PI. Operation for a general sample-and-hold circuit includes a sampling operation and a holding operation. Therefore, when the write sampling control signal WSC is at high level, the write period sample-and-hold circuit 206 samples the power sampling signal PI, and when the write sampling control signal WSC is at low level, the write period sample-and-hold circuit 206 holds the level of the power sampling signal PI that is sampled as the write sampling control signal WSC is transient from high level to low level. The bias period sample-and-hold circuit 208 is controlled by the bias sampling control signal BSC in the same manner. Accordingly, the write period sample-and-hold circuit 206 is controlled by the write sampling control signal WSC to sample the power sampling signal PI when the write sampling control signal WSC becomes high level within the write period of the power sampling signal PI, by which the signal level of the power sampling signal PI is obtained. This sampled signal level corresponds to the write power of the light beam emitted by the laser diode within the write period. Similarly, the bias period sample-and-hold circuit 208 is controlled by the bias sampling control signal BSC to sample the power sampling signal PI when the bias sampling control signal BSC becomes high level within the bias period of the power sampling signal PI, by which the signal level of the power sampling signal PI is obtained. This sampled signal level corresponds to the bias power of the light beam emitted by the laser diode within the bias period.

The sampling time for the general sample-and-hold circuit has to be larger than a specified value so that the sample-and-hold circuit can operate normally. As the technology of the recordable optical disk drive is highly developed, a high-speed recordable optical disk drive becomes the main product gradually in the market. However, if the recordable optical disk drive is operated in high speed, the frequency of power sampling signal PI increases, causing that intervals of the write period and the bias period are shortened. In the situation, because the general sample-and-hold circuit is not fast enough, the sampling time becomes too long so that the signal levels in the write period and the bias period of the sampling signal PI cannot be correctly sampled.

FIG. 4 shows relevant high frequency waveforms of the power sampling signal PI, the write sampling control signal WSC and the bias sampling control signal. When the frequency of the power sampling signal PI increases and the write period and the bias period are shortened, the conventional power control circuit of the recordable optical disk drive cannot sample the signal levels correctly because of the speed limitation of the write sample-and-hold circuit 206 and the bias sample-and-hold circuit 208, thereby the optical signals from the laser diode cannot be correctly compensated. However, if a high-speed sample-and-hold circuit is used, cost becomes higher. Therefore, it is necessary to develop a power control circuit that is suitable for a high-speed recordable optical disk drive without the need of high cost sample-and-hold circuit.

SUMMARY OF THE INVENTION

According to the foregoing description, an object of this invention is to provide a power control circuit for an optical information recording apparatus. Due to its low cost, the power control circuit of the invention is suitable for a high-speed optical information recording apparatus.

According to the object(s) mentioned above, a power control circuit is provided. The power control circuit is used for an optical disk drive, wherein the optical disk drive has a diode driving circuit, a light emitting diode and a photo diode. The diode driving circuit is used for outputting a driving signal to the light emitting diode, the light emitting diode generates an optical signal corresponding to the driving signal, and the photo diode is used for sensing the optical signal to generate a power sampling signal correspondingly. The power control circuit comprises an erase-period sample-and-hold circuit, a peak envelope acquiring circuit, a bottom envelope acquiring circuit, a write-period sample-and-hold circuit and a bias-period sample-and-hold circuit. The erase-period sample-and-hold circuit is used for receiving the power sampling signal, and then outputting an erase-period sample-and-hold signal to the diode driving circuit. The peak envelope acquiring circuit is used for receiving the power sampling signal and outputting a peak envelope signal. The bottom envelope acquiring circuit is used for receiving the power sampling signal and outputting a bottom envelope signal. The write-period sample-and-hold circuit is used for receiving the peak envelope signal, and outputting a write-period sample-and-hold signal to the diode driving circuit. The bias-period sample-and-hold circuit is used for receiving the bottom envelope signal, and outputting a bias-period sample-and-hold signal to the diode driving circuit. Thereby, the diode driving circuit alters the driving signal according to the erase-period sample-and-hold signal, the write-period sample-and-hold signal, and the bias-period sample-and-hold signal so that power of the optical signal is adjusted.

The invention further provides a power control circuit for an optical disk drive, wherein the optical disk drive has a diode driving circuit, a light emitting diode and a photo diode. The diode driving circuit is used for outputting a driving signal to the light emitting diode, the light emitting diode generates an optical signal corresponding to the driving signal, and the photo diode is used for sensing the optical signal to generate a power sampling signal correspondingly. The power control circuit comprises an erase-period sample-and-hold circuit, a peak envelope sample-and-hold circuit and a bottom envelope sample-and-hold circuit. The erase-period sample-and-hold circuit is used for receiving the power sampling signal, and then outputting an erase-period sample-and-hold signal to the diode driving circuit. The peak envelope sample-and-hold circuit is used for receiving the power sampling signal and outputting a write-period sample-and-hold signal to the diode driving circuit. The bottom envelope sample-and-hold circuit is used for receiving the power sampling signal and outputting a bias-period sample-and-hold signal to the diode driving circuit. Thereby, the diode driving circuit alters the driving signal according to the erase-period sample-and-hold signal, the write-period sample-and-hold signal, and the bias-period sample-and-hold signal so that power of the optical signal is adjusted.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

A power sampling signal from a photodiode is transmitted to a peal envelope acquiring circuit and a bottom envelope acquiring circuit and then sampled and held, which is fed-back to a laser diode driving circuit. The laser diode driving circuit alters a driving signal emitted to the laser diode according to the fed-back signal to adjust the power of the optical signal emitted from the laser diode. Therefore, a low-cost and high-speed recordable optical disk drive can be made.

<<First Embodiment>>

Figure 1:
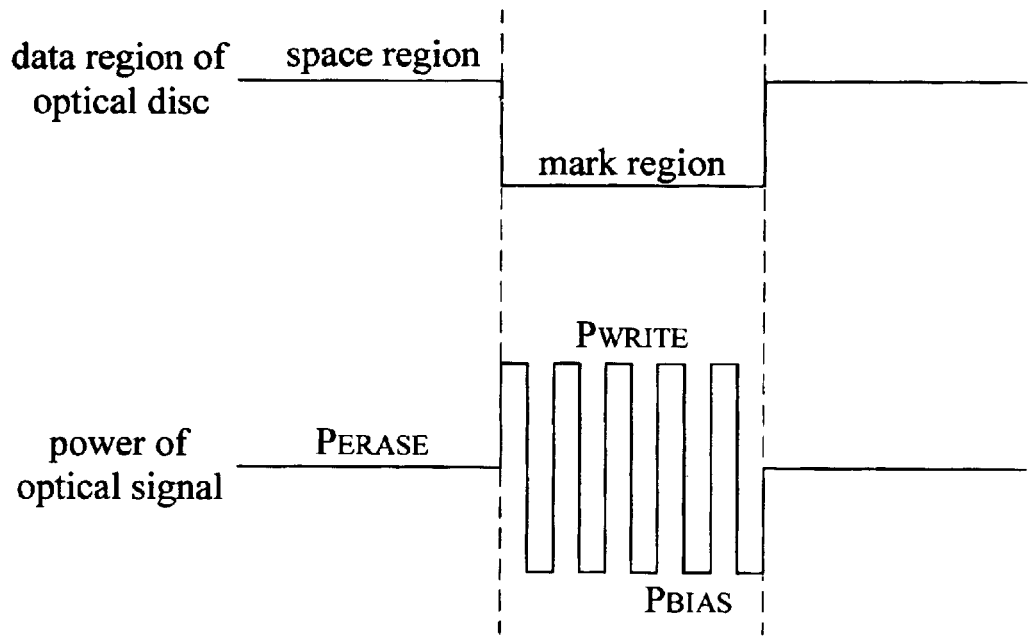
FIG. 1 schematically shows a graph that power of an optical signal during writing varies with respect to its corresponding a data area of an optical disc.
Figure 2:
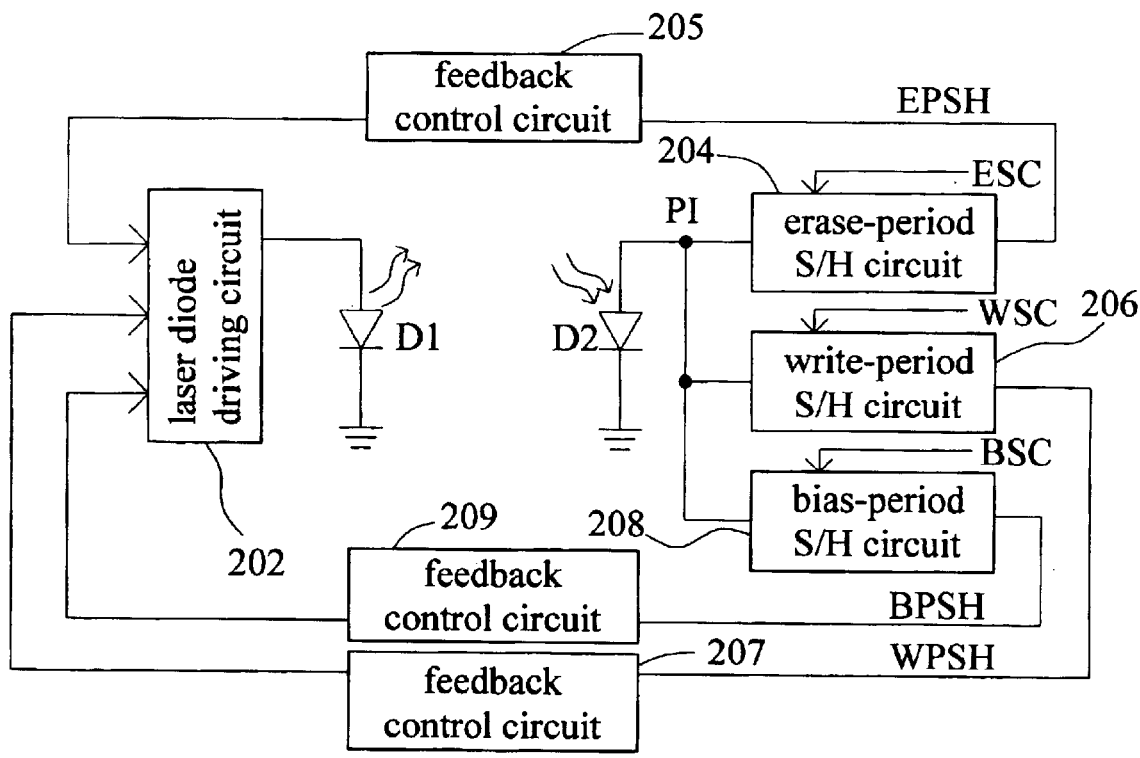
FIG. 2 shows a conventional power control circuit for a recordable optical disk drive.
Figure 3:
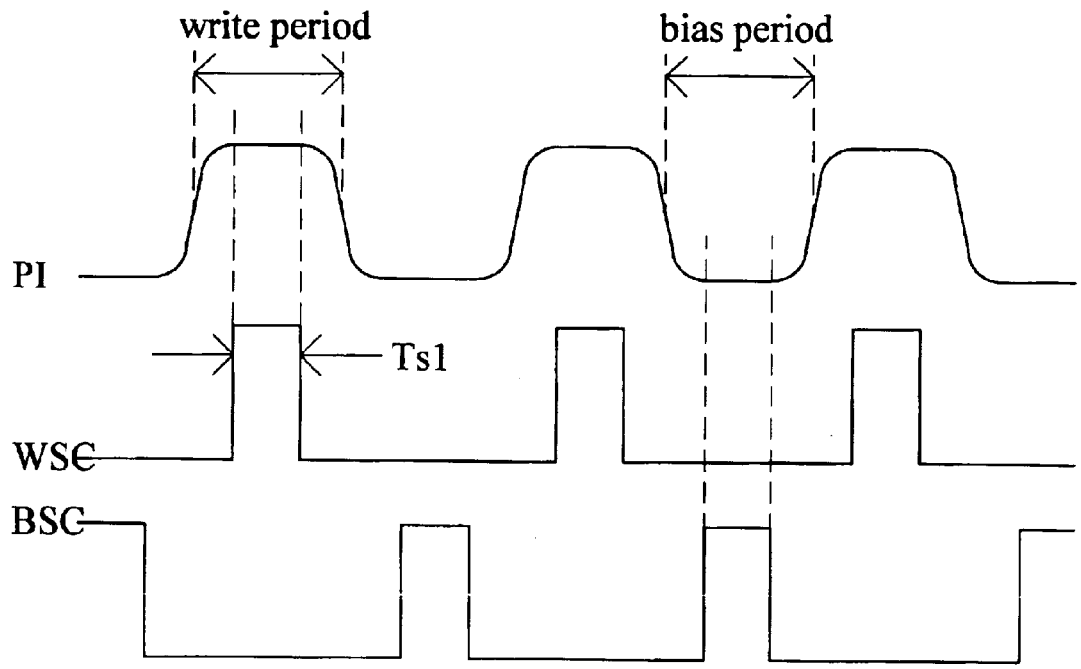
FIG. 3 shows waveforms of the power sampling signal PI, the write sampling control signal WSC and the bias sampling control signal BSC in FIG. 2.
Figure 4:
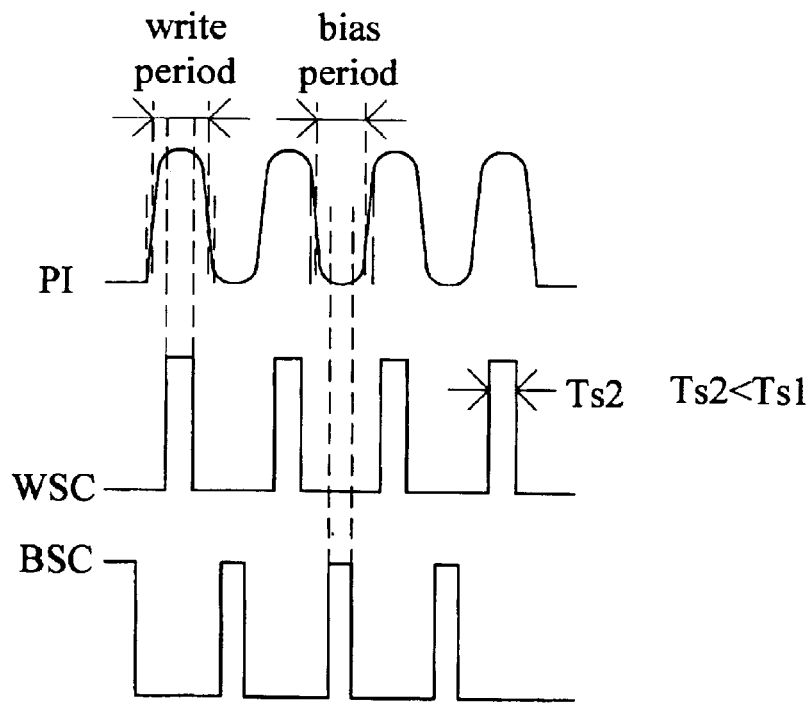
FIG. 4 shows relevant high frequency waveforms of the power sampling signal PI, the write sampling control signal WSC and the bias sampling control signal.
Figure 5:
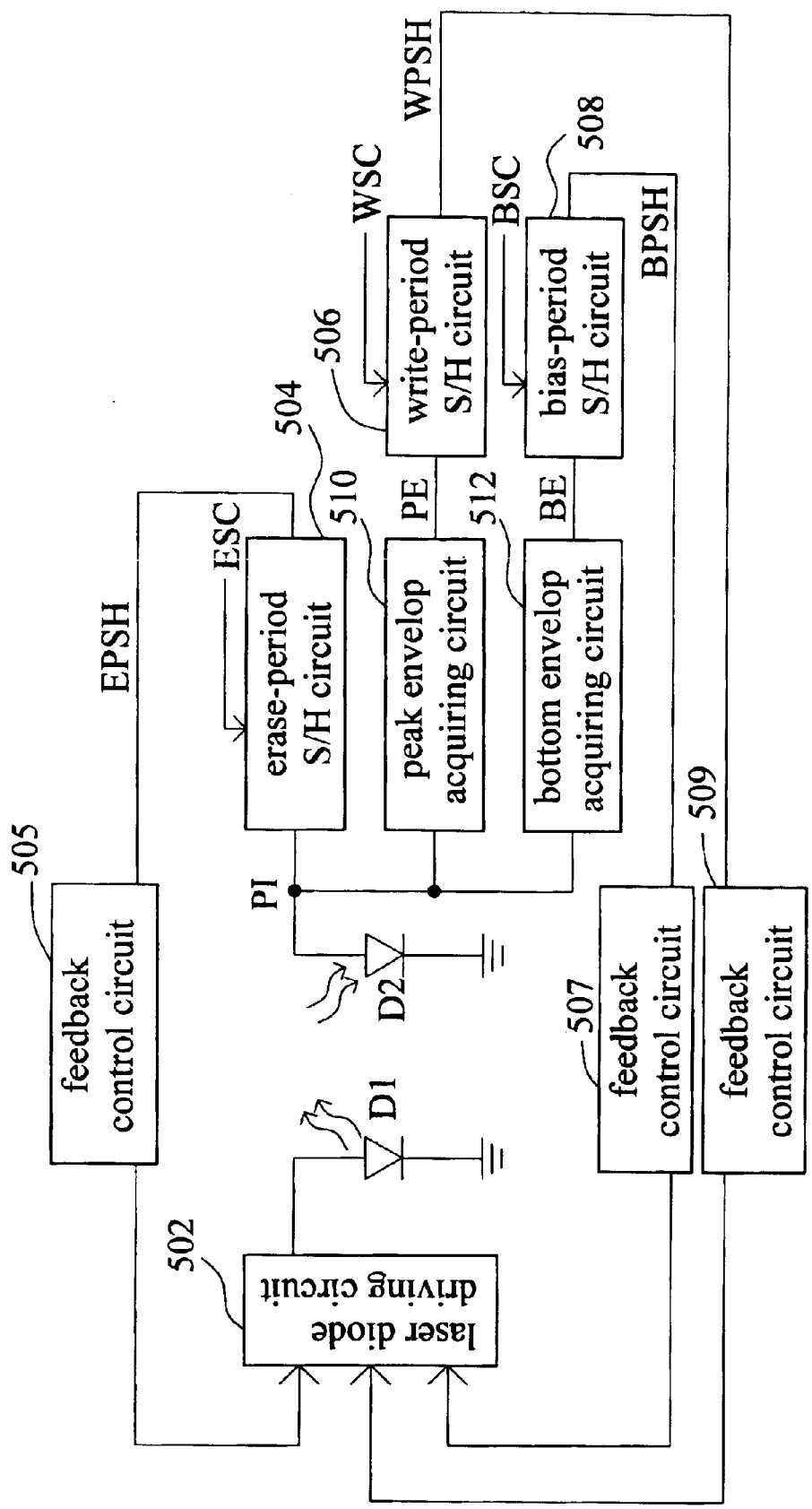
FIG. 5 schematically shows a block diagram of a power control circuit for a recordable optical disk drive according to the first embodiment of the invention.

FIG. 5 schematically shows a block diagram of a power control circuit for a recordable optical disk drive according to the first embodiment of the invention. The laser diode D1 is used for receiving a driving signal from a laser diode driving circuit 502 to generate a corresponding optical signal. The optical signal is illuminated to an optical disc (not shown) for recording data on the optical disc. In order to compensate the optical signal, a photodiode D2 is used for sensing the optical signal emitted from the laser diode D1 to generate a corresponding power sampling signal PI. The power sampling signal PI is transmitted to an erase-period sample-and-hold circuit 504, a write-period sample-and-hold circuit 506, a peak envelope acquiring circuit 510 and a bottom envelope acquiring circuit 512, respectively.

The peak envelope acquiring circuit 510 is used for detecting an envelope formed by a positive peak of the power sampling signal PI so that a peak envelope signal PE is generated and outputted. The bottom envelope acquiring circuit 512 is used for detecting an envelope formed by a negative peak of the power sampling signal PI so that a bottom envelope signal BE is generated and outputted. The peak envelope signal PE and the bottom envelope signal BE are respectively transmitted to the write-period sample-and-hold circuit 506 and the bias-period sample-and-hold circuit 508.

Additionally, the erase-period sample-and-hold circuit 504 is controlled by an erase sample-and-hold control signal ESC to sample the power sampling signal PI within the erase period, by which an erase-period sample-and-hold signal EPSH is generated and fed-back to the feedback control circuit 505. The feedback control circuit 505 converts the erase-period sample-and-hold signal EPSH to a signal that is acceptable to the laser diode driving circuit 502 and then transmits the converted signal to the laser diode driving circuit 502. The erase-period sample-and-hold circuit 506 is controlled by a write sample-and-hold control signal WSC to sample the peak envelope signal PE, by which a write-period sample-and-hold signal WPSH is generated and fed-back to the feedback control circuit 507. The feedback control circuit 507 converts the write-period sample-and-hold signal WPSH to a signal that is acceptable to the laser diode driving circuit 502 and then transmits the converted signal to the laser diode driving circuit 502. The bias-period sample-and-hold circuit 508 is controlled by a bias sample-and-hold control signal BSC to sample the bottom envelope signal BE, by which a bias-period sample-and-hold signal BPSH is generated and fed-back to the feedback control circuit 507. The feedback control circuit 507 converts the bias-period sample-and-hold signal BPSH to a signal that is acceptable to the laser diode driving circuit 502 and then transmits the converted signal to the laser diode driving circuit 502. Accordingly, the laser diode driving circuit 502 alters the driving signal that is outputted to the laser diode D1 according to the erase-period sample-and-hold signal EPSH, the write-period sample-and-hold signal WPSH, and the bias-period sample-and-hold signal BPSH so as to adjust the magnitudes of the erase power, the write power and the bias power of the optical signal, by which the compensation for the optical signal is completed.

Figure 6:
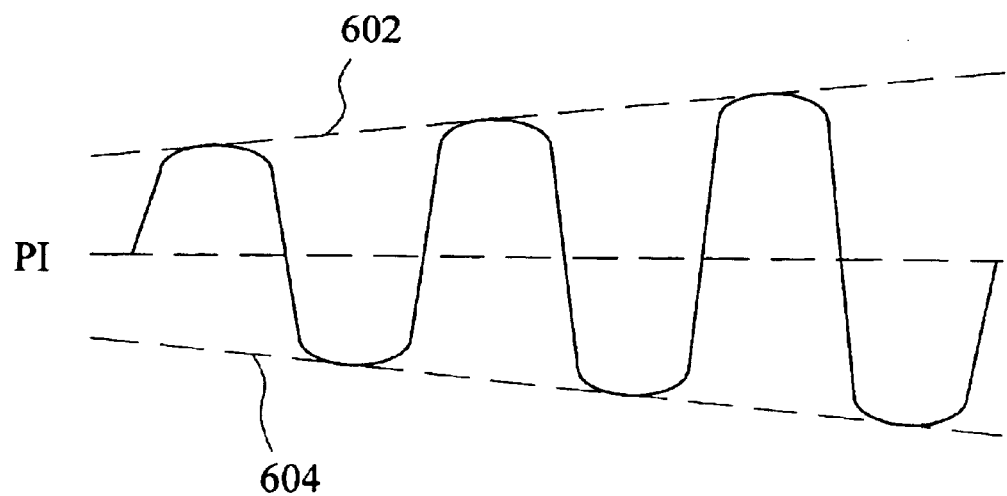
FIG. 6 shows waveforms of the power sampling signal PI, the peak envelope signal PE and the bottom envelope signal BE in FIG. 5.

FIG. 6 shows waveforms of the power sampling signal PI, the peak envelope signal PE and the bottom envelope signal BE in FIG. 5. The envelope formed by the positive peaks of the power sampling signal PI is depicted as a dash line 602, and the envelope formed by the negative peaks of the power sampling signal PI is depicted as a dash line 604. The peak envelope acquiring circuit 510 and the bottom envelope acquiring circuit 512 detect respectively the envelopes (as shown in dash lines 602, 604) formed by the positive peaks and the negative peaks of the power sampling signal PI, and then generate the peak envelope signal PE and the bottom envelope signal BE that correspond to dash lines 602, 604 respectively. The peak envelope signal PE can be set as an average level of the power sampling signal PI within the write period, and the bottom envelope signal BE can be set as an average level of the power sampling signal PI within the bias period. The frequencies of the peak envelope signal PE and the bottom envelope signal BE are much lower than the frequency of the power sampling signal PI.

As described above, in stead of directly sampling the power sampling signal PI having a much higher frequency, the peak envelope signal PE and the bottom envelope signal BE that have lower frequencies are respectively sampled by the write-period sample-and-hold circuit 506 and the bias-period sample-and-hold circuit 508. Accordingly, it can effectively prevent from that the frequency of the power sampling signal PI is too high to get its signal level accurately by the sample-and-hold circuit. According to the invention, due to low frequencies of the peak envelope signal PE and the bottom envelope signal BE, a general low-speed sample-and-hold circuit can be normally operated to compensate the optical signals emitted from the laser diode D1. Unlike the conventional one, no sample-and-hold circuit that is operated under high frequency is required, and therefore cost for high-speed sample-and-hold circuit can be saved.

Figure 7:
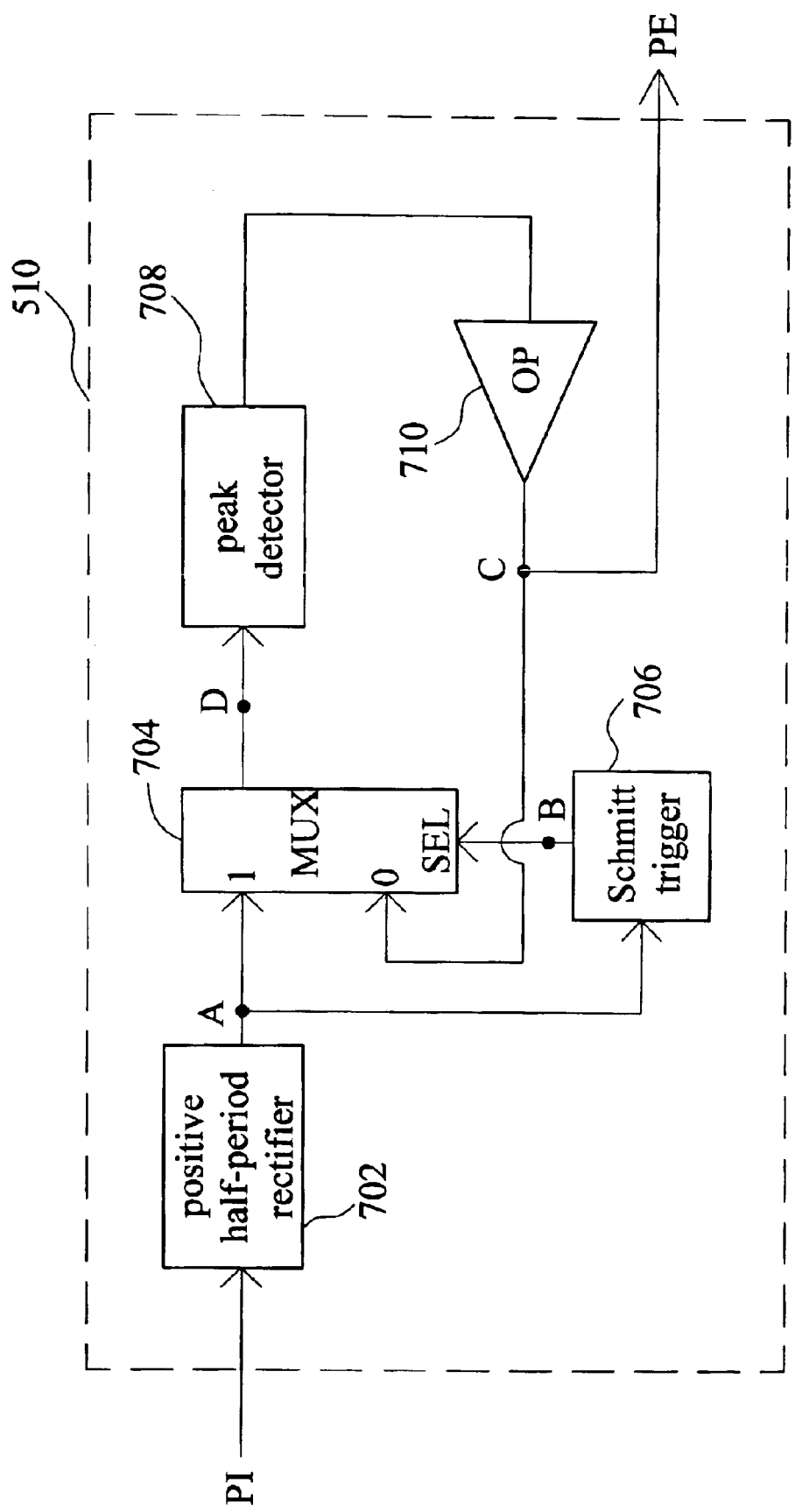
FIG. 7 shows an exemplary block diagram of the peak envelope acquiring circuit in FIG. 5.

FIG. 7 shows an exemplary block diagram of the peak envelope acquiring circuit in FIG. 5. The peak envelope acquiring circuit 510 comprises a positive half-wave rectifier 702, a multiplexer 704, a Schmitt trigger 706, a peak detector 708 and an amplifier 710. The power sampling signal PI is inputted to the positive half-wave rectifier 702. The positive half-wave rectifier 702 then outputs a first output signal A having the positive levels of the power sampling signal PI. The first output signal A is transmitted to the multiplexer 704 and the Schmitt trigger 706 respectively. The Schmitt trigger 706 generates a second output signal B in response to the first output signal A. A third output signal C from the amplifier 710 is also inputted to the multiplexer 704. The second output signal B is transmitted to a selection terminal SEL of the multiplexer 704 for selecting the first output signal A or the third output signal C as a fourth output signal D, which is then transmitted to the peak detector 708. The peak detector 708 detects a peak value of the fourth output signal D that is inputted to the amplifier 710. The gain of the amplifier 710 is 1. The amplifier 710 possesses a holding function for filtering the high frequency signals, and outputs the third output signal C. Therefore, the third output signal C from the amplifier 710 corresponds to a low frequency signal of the peak of the fourth output signal D. The peak envelope acquiring circuit 510 outputs the third output signal C as the peak envelope signal PE.

Figure 8:
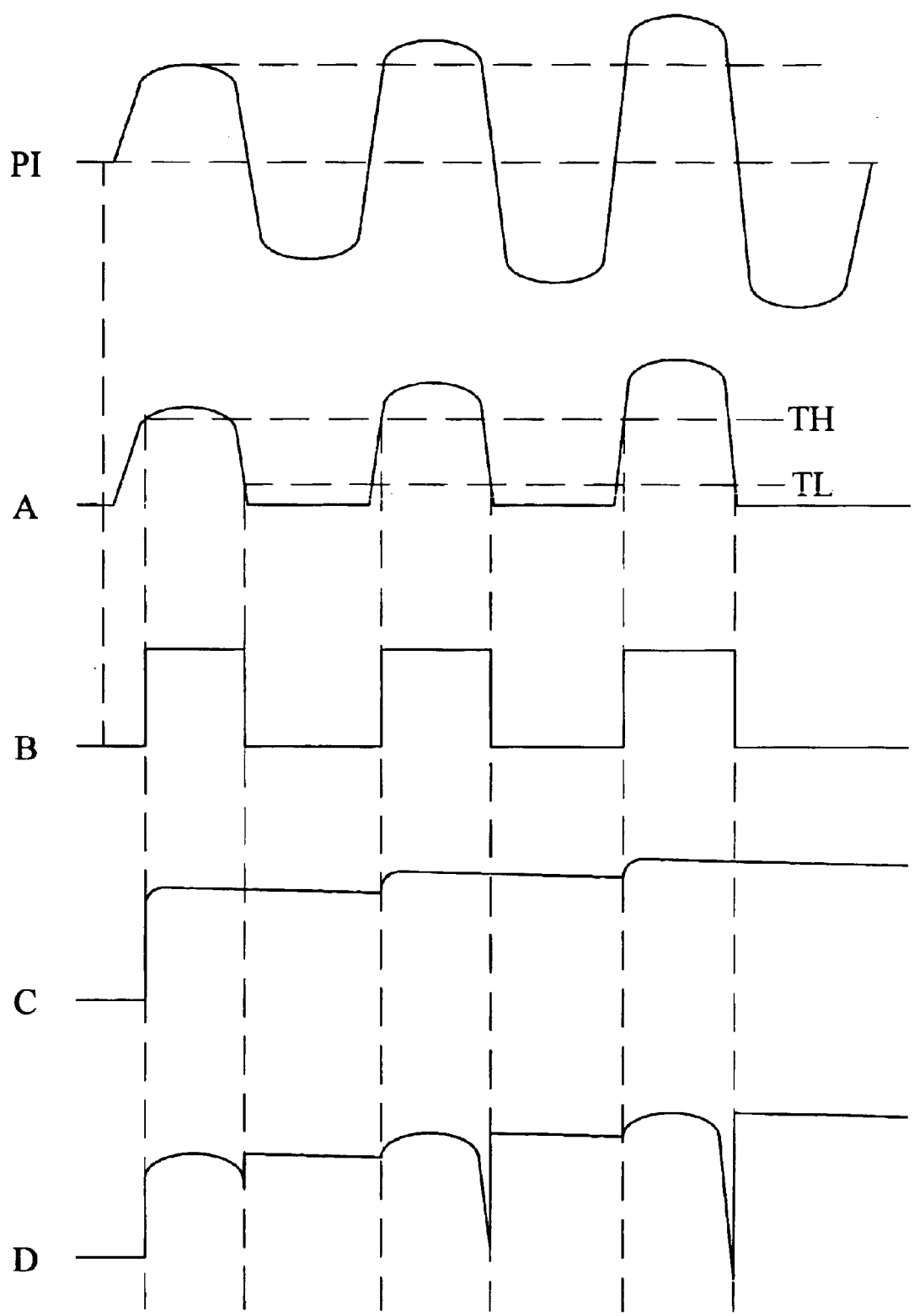
FIG. 8 schematically shows an example of relevant waveforms of the power sampling signal PI, the first output signal A, the second output signal B, the third output signal C and the fourth output signal in the peak envelope acquiring circuit shown in FIG. 7.

FIG. 8 schematically shows an example of relevant waveforms of the power sampling signal PI, the first output signal A, the second output signal B, the third output signal C and the fourth output signal in the peak envelope acquiring circuit shown in FIG. 7. As shown, the first output signal A corresponds to positive levels of the power sampling signal PI. When the level of the first output signal A is higher than the level of a high triggering level TH of the Schmitt trigger circuit 706, the second output signal B is logic "1", and when the level of the first output signal A is lower than the level of a low triggering level TL of the Schmitt trigger circuit 706, the second output signal B is logic "0". When the second output signal B is logic "1", the multiplexer 704 outputs the first output signal A as the fourth output signal D, and when the second output signal B is logic "0", the multiplexer 704 outputs the third output signal C as the fourth output signal D. After the fourth output signal D is processed by the peal detector 708 and the amplifier 710, the third output signal C varies with the peak values of the fourth output signal D. Therefore, the third output signal C is the, envelope formed by the positive peaks of the power sampling signal PI.

Similarly, the bottom envelope acquiring circuit 512 is similar to the peak envelope acquiring circuit 510, which a negative half-wave rectifier 702 is used for replacing the positive half-wave rectifier 702 in FIG. 7 to get the bottom envelope signal BE. Although the peak envelope acquiring circuit 510 is used for the description, it is not to limit the scope of the invention. Any circuit capable of detecting the envelope formed by the positive peaks and the envelope formed by the negative peaks of the power sampling signal PI can serve as the envelope acquiring circuit of the invention. In addition, the application of the invention is not only the recordable optical disk drives, but also other optical disk drive systems. Moreover, the laser diode of the invention can be replaced by any other type of light emitting diodes.

<<Second Embodiment>>

Figure 9:
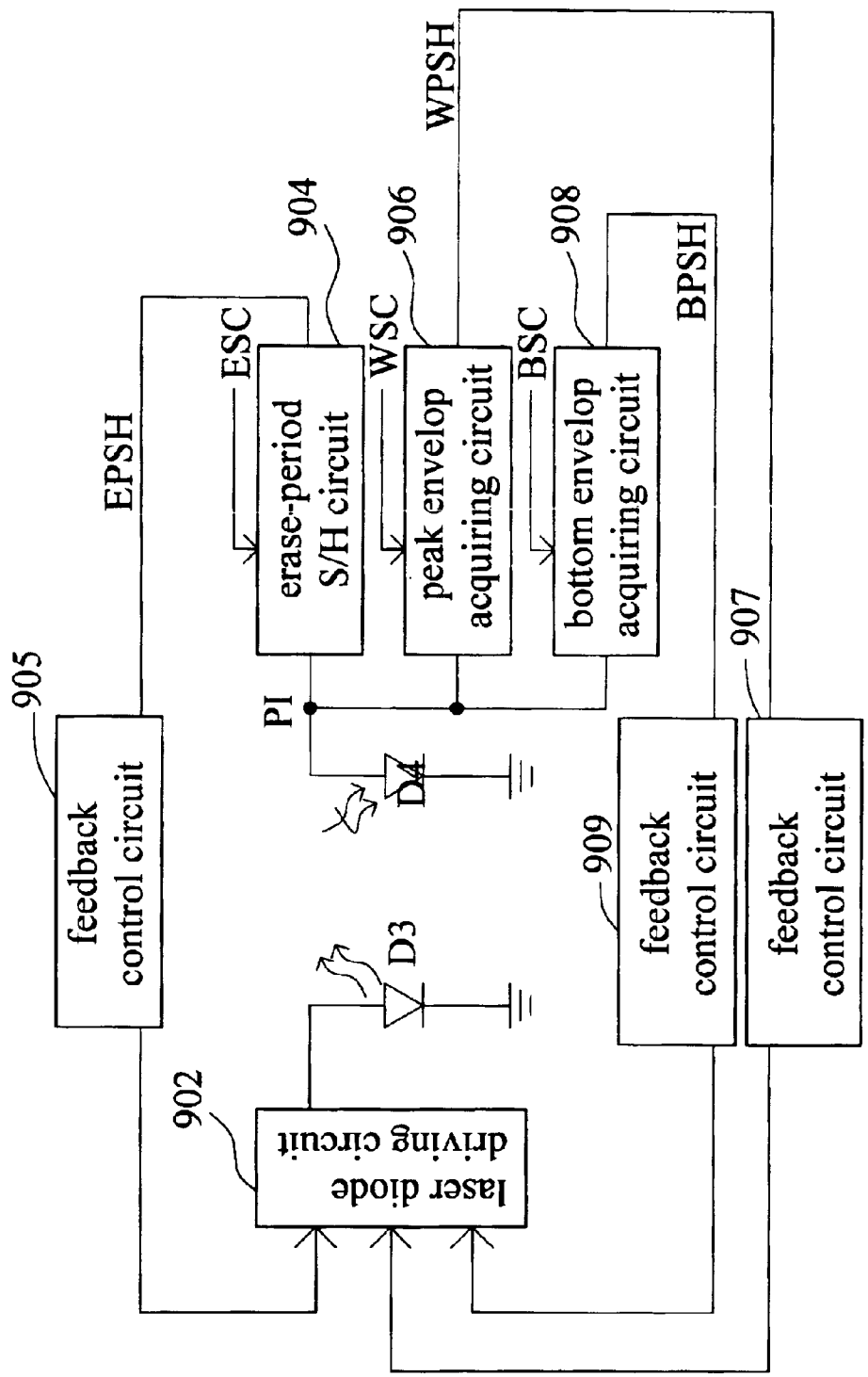
FIG. 9 schematically shows a block diagram of a power control circuit for an recordable optical disk drive according to the second embodiment of the invention.

FIG. 9 schematically shows a block diagram of a power control circuit for a recordable optical disk drive according to the second embodiment of the invention. A laser diode D3 receives a driving signal outputted from a laser diode driving circuit 902 to generate a corresponding optical signal. A photodiode D4 is used for sensing the optical signal emitted from the laser diode D3 to generate a corresponding power sampling signal PI. The power sampling signal PI is transmitted to an erase-period sample-and-hold circuit 904, a peak envelope sample-and-hold circuit 904 and a bottom envelope sample-and-hold circuit 908, respectively.

The erase-period sample-and-hold circuit 904 is controlled by an erase sample-and-hold control signal ESC to sample the power sampling signal PI within the erase period, by which an erase-period sample-and-hold signal EPSH is generated and fed-back to the feedback control circuit 905. The feedback control circuit 905 converts the erase-period sample-and-hold signal EPSH to a signal that is acceptable to the laser diode driving circuit 902 and then transmits the converted signal to the laser diode driving circuit 902.

The peak envelope sample-and-hold circuit 906 is controlled by a write sample-and-hold control signal WSC to sample the power sampling signal PI within the write period, by which a write-period sample-and-hold signal WPSH is generated and fed-back to the feedback control circuit 907. The feedback control circuit 907 converts the write-period sample-and-hold signal WPSH to a signal that is acceptable to the laser diode driving circuit 902 and then transmits the converted signal to the laser diode driving circuit 902.

The bottom envelope sample-and-hold circuit 908 is controlled by a bias sample-and-hold control signal BSC to sample the power sampling signal PI within the bias period, by which a bias-period sample-and-hold signal BPSH is generated and fed-back to the feedback control circuit 909. The feedback control circuit 909 converts the bias-period sample-and-hold signal BPSH to a signal that is acceptable to the laser diode driving circuit 902 and then transmits the converted signal to the laser diode driving circuit 902.

Accordingly, the laser diode driving circuit 902 alters the driving signal that is outputted to the laser diode D3 according to the erase-period sample-and-hold signal EPSH, the write-period sample-and-hold signal WPSH, and the bias-period sample-and-hold signal BPSH so as to adjust the erase power, the write power and the bias power of the optical signal, by which the compensation for the optical signal is completed.

Figure 10A:
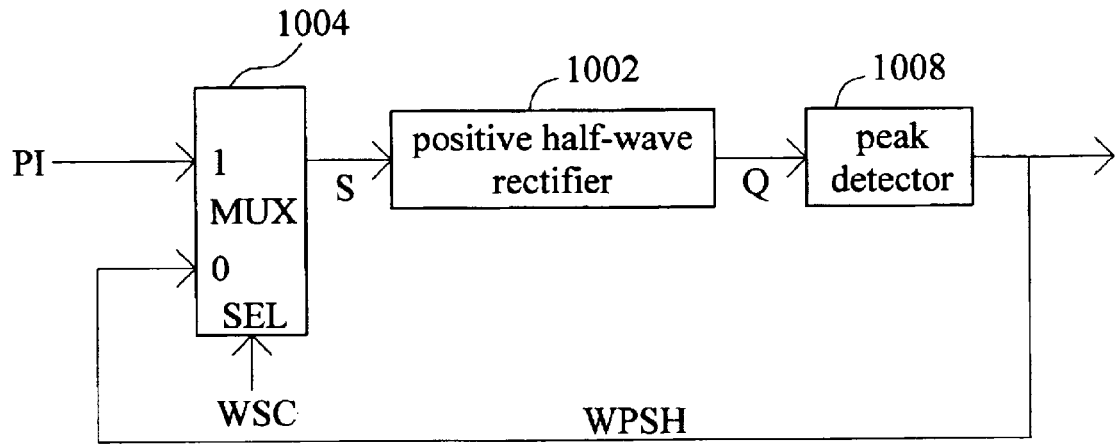
FIG. 10A shows an exemplary block diagram of the peak envelope sampling/holding circuit in FIG. 9.
Figure 10B:
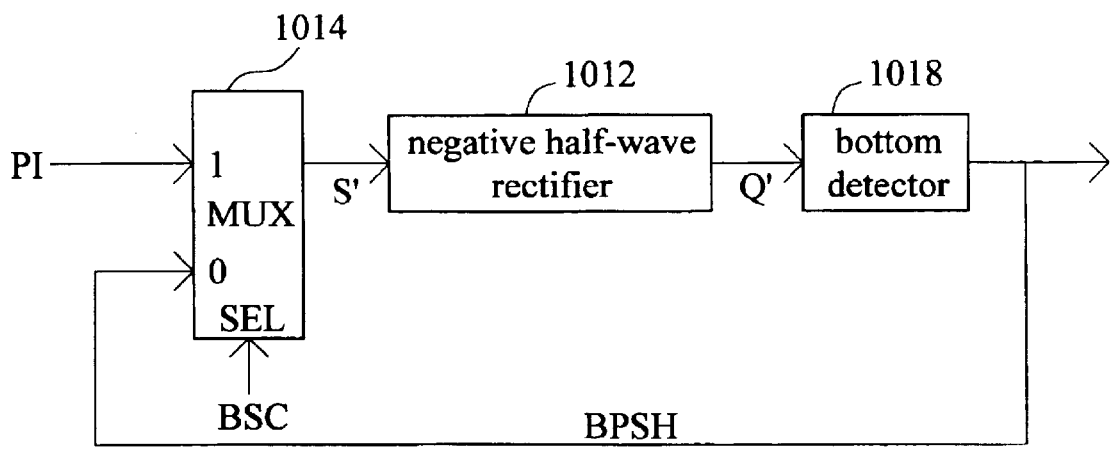
FIG. 10B shows an exemplary block diagram of the bottom envelope sampling/holding circuit in FIG. 9.

FIG. 10A shows an exemplary block diagram of the peak envelope sampling/holding circuit in FIG. 9; and FIG. 10B shows an exemplary block diagram of the bottom envelope sampling/holding circuit in FIG. 9. The peak envelope sample-and-hold circuit 906 comprises a positive half-wave rectifier 1002, a multiplexer 1004 and a peak detector 1008. The power sampling signal PI and the write-period sample-and-hold signal WPSH are inputted to the multiplexer 1004. The multiplexer 1004 receives the write sampling control signal WSC to generate an output signal S corresponding to power sampling signal PI and the write-period sample-and-hold signal WPSH. The output signal S is then transmitted to the positive half-wave rectifier 1002 to sample the positive levels of the power sampling signal PI as an output signal Q. The output signal Q is then transmitted to the peak detector 1008 to generate the write-period sample-and-hold signal WPSH.

Similarly, as shown in FIG. 10B, the bottom envelope sample-and-hold circuit 908 comprises a negative half-wave rectifier 1012, a multiplexer 1014 and a peak detector 1018. The power sampling signal PI and the bias-period sample-and-hold signal BPSH are inputted to the multiplexer 1014. The multiplexer 1014 receives the bias sampling control signal BSC to generate an output signal S' corresponding to the power sampling signal PI and the bias-period sample-and-hold signal BPSH. The output signal S is then transmitted to the negative half-wave rectifier 1012 to sample the negative levels of the power sampling signal PI as an output signal Q'. The output signal Q' is then transmitted to the peak detector 1018 to generate the bias-period sample-and-hold signal BPSH.

Figure 11:
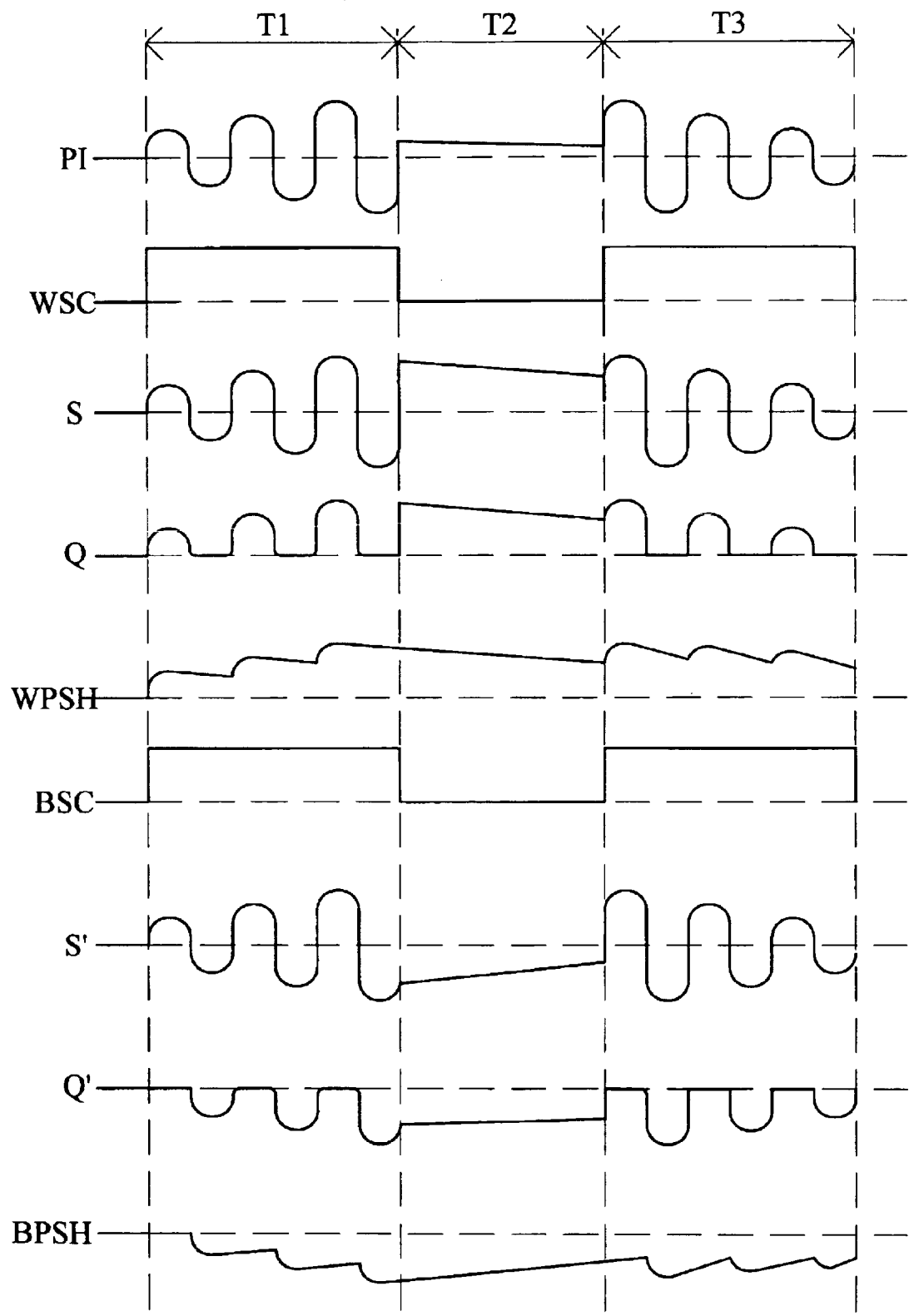
FIG. 11 schematically shows relevant waveforms of the power sampling signal PI, the write sampling control signal WSC, the output signal S, the output signal Q, the write-period sample-and-hold signal WPSH, the bias sampling control signal BSC, the output signal S', the output signal Q', and the bias-period sample-and-hold signal BPSH in the peak and bottom envelope sampling/holding circuits shown in FIGS. 10A and 10B.

FIG. 11 schematically shows relevant waveforms of the power sampling signal PI, the write sampling control signal WSC, the output signal S, the output signal Q, the write-period sample-and-hold signal WPSH, the bias sampling control signal BSC, the output signal S', the output signal Q', and the bias-period sample-and-hold signal BPSH in the peak and bottom envelope sampling/holding circuits shown in FIGS. 10A and 10B. FIG. 11 shows waveform diagrams when the laser beam reaches the space region of the optical disc in time intervals T1 and T3, and waveform diagrams when the laser beam reaches the mark region of the optical disc in time interval T2. When the write sampling control signal WSC is logic "1", the multiplexer 1004 outputs the power sampling signal PI as the output signal S, and when the write sampling control signal WSC is logic "0", the multiplexer 1004 outputs the write-period sample-and-hold signal WPSH as the output signal S. The output signal Q corresponds to the output signal S with positive level. The write-period sample-and-hold signal WPSH corresponds to the peaks of the output signal Q.

When the bias sampling control signal BSC is logic "1", the multiplexer 1014 outputs the power sampling signal PI as the output signal S', and when the bias sampling control signal BSC is logic "0", the multiplexer 1014 outputs the bias-period sample-and-hold signal BPSH as the output signal S'. The output signal Q corresponds to the output signal S' with negative level. The bias-period sample-and-hold signal BPSH corresponds to the peaks of the output signal Q'.

As shown in FIGS. 9 and 10A–10B, because the write sampling control signal WSC and the bias sampling control signal BSC are used for controlling the multiplexers 1004, 1014 respectively, for example logic "1" in the time intervals T1, T3 and logic "0" in the time intervals T2, the frequencies of the write sampling control signal WSC and the bias sampling control signal BSC of the invention are much lower than the frequency of the power sampling signal PI. For a high-speed optical information recording apparatus, unlike the conventional power control circuit that requires a sample-and-hold circuit capable of being operated in high frequency, although the frequency of the power sampling signal PI is still very high, but the write sampling control signal WSC and the bias sampling control signal BSC with lower frequencies are only required to achieving its purposes. Therefore, cost of the device can be significantly saved.

According to the power control circuit for the optical information recording apparatus of the invention, a low-speed sample-and-hold at low cost can be used for acquiring the signal level of the high-frequency power sampling signal, so that the optical signal can be properly adjusted for an application of a high-speed optical recording disc. This invention is particularly suitable for low-cost and high-speed optical information recording apparatus.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. A method for controlling a bias power of an optical disk device, comprising:
    generating a bottom envelope signal from a power sampling signal sensed by a photodiode of the optical disk device;
    sampling the bottom envelope signal; and
    controlling a bias power of the optical disk device responsive to the sampled bottom envelope signal,
    wherein a frequency of the bottom envelope signal is lower than that of the power sampling signal.

2. The method according to claim 1 wherein the step of generating the bottom envelope signal comprises:
    obtaining a negative half-wave of the power sampling signal;
    selecting a candidate signal from the negative half-wave of the power sampling signal and the bottom envelope signal; and
    obtaining a bottom value of the candidate signal as a next bottom envelope signal.

3. The method according to claim 2 wherein a high frequency signal of the next bottom envelope signal is filtered out before performing the sampling step.

4. A method for controlling a write power of an optical disk device, comprising:
    generating a peak envelope signal from a power sampling signal sensed by a photodriode of the optical disk device;
    sampling the peak envelope signal; and
    controlling a write power of the optical disk device responsive to the sampled peak envelope signal,
    wherein a frequency of the peak envelope signal is lower than that of the power sampling signal.

5. The method according to claim 4 wherein the step of generating the peak envelope signal comprises:
    obtaining a postive half-wave of the power sampling signal;
    selecting a candidate signal from the positive half-wave of the power sampling signal and the peak envelope signal; and
    obtaining a peak value of the candidate signal as a next peak envelope signal.

6. The method according to claim 5 wherein a high frequency signal of the next peak envelope signal is filtered out before performing the sampling step.

7. A bias power control circuit of an optical disk drive comprising:
    a bottom envelope acquiring circuit for outputting a bottom envelope signal responsive to a power sampling signal sensed by a photodiode of the optical disk device; and
    a bias-period sample-and-hold circuit for sampling and outputting the bottom envelope signal wherein the bias power is controlled according to the sampled bottom envelope signal, and
    wherein a frequency of the bottom envelope signal is lower than that of the power sampling signal.

8. The bias power control circuit of claim 7 wherein the bottom envelope acquiring circuit further comprises:
    a selector for outputting a candidate signal selected from the bottom envelope signal and a negative half-wave of the power sampling signal; and
    a bottom detector for obtaining a bottom value of the candidate signal as a next bottom envelope signal.

9. The basis power control circuit of claim 8 further comprising an amplifier for filtering out a high frequency signal of the next bottom envelope signal before being sampled.

10. The bias power control circuit of claim 8 wherein a diode driving circuit of the optical disk drive adjusts the bias power according to the sampled bottom envelope signal.

11. A write power control circuit for an optical disk drive comprising:
    a peak envelope acquiring circuit for outputting a peak envelope signal in responsive to a power sampling signal by a photodiode of the optical disk device; and
    a write-period sample-and-hold circuit for sampling and outputting the peak envelope signal wherein the write power is controlled according to the sampled peak envelope signal, and wherein a frequency of the peak envelope signal is lower than that of the power sampling signal.

12. The write power control circuit of claim 11 wherein the peak envelope acquiring circuit further comprises:
- a selector for outputting a candidate signal selected from the peak envelope signal and a positive half-wave of the power sampling signal; and
- a peak detector for obtaining a peak value of the candidate signal as a next peak envelope signal.

13. The write power control circuit of claim 12 further comprising an amplifier for filtered out a high frequency signal of the next peak envelope signal before being sampled.

14. The write power control circuit of claim 11 wherein a diode driving circuit of the optical disk drive adjusts the write power according to the sampled peak envelope signal.

* * * * *